G. H. MIXER.
Bush-Inserter.
No. 209,353.  Patented Oct. 29, 1878.
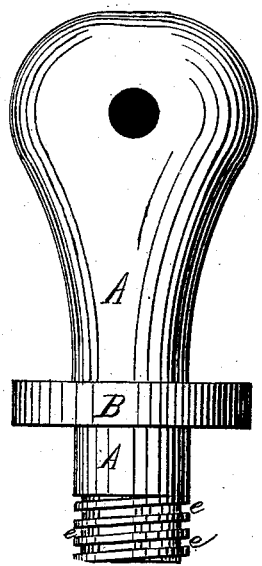

UNITED STATES PATENT OFFICE.

GEORGE H. MIXER, OF SAN FRANCISCO, CALIFORNIA.

IMPROVEMENT IN BUSH-INSERTERS.

Specification forming part of Letters Patent No. 209,353, dated October 29, 1878; application filed April 8, 1878.

*To all whom it may concern:*

Be it known that I, GEORGE H. MIXER, of the city and county of San Francisco, in the State of California, have invented an Improved Implement for Inserting Bushes into the Bung-Holes of Barrels; and I do hereby declare that the following is a full, clear, and exact description thereof, reference being had to certain drawings, forming a part of this specification.

My invention has reference to an improved device or implement called an "inserter," for putting screw-bushes or metal linings into the bung-holes of barrels; and it relates more particularly to certain improvements by which the implement is adapted for inserting the bushes for which I have recently applied for Letters Patent.

The bush referred to above has screw-threads on its exterior, which are intended to cut into the wood when the bush is screwed into the bung-hole in the stave. Its interior wall is tapering, being larger at the top than at the bottom, and this wall is smooth from the top of the bush to near its bottom. A shallow screw-thread or spiral crease is made on the interior face or wall of the bush, near its lower edge, making two or three turns, as represented. My inserter is intended to engage with this shallow thread or crease, for the purpose of allowing me to apply power to turn the bush into the bung-hole in the stave.

Referring to the drawing, A represents a cylindrical bar of metal, which can either have a hole through its upper end, through which a rod can be inserted to serve as a lever, or it can have oppositely-extending arms arranged to form lever-handles. On this bar of metal I make a flange or projection, B, at a distance from its lower end equal to the thickness of the bush. I then make a screw-thread or spiral crease, e, on its lower end, which will correspond with the screw-thread or spiral crease in the bush, so that when the end of the implement is inserted into the bush and given a few turns the screw-threads on the implement will turn into the screw-threads in the bush until the shoulder, flange, or projection B strikes the upper edge of the bush. Power can then be applied to the lever-handles to turn the bush into the bung-hole, after which a few turns of the implement in a reverse direction will release the screw portion of the implement, and it can be removed, leaving the bush in the bung-hole. As the interior of the bush is tapering and the lower end of the implement is straight, the implement will readily drop into the bush until it strikes the threaded portion, after which a few turns engage the screw-threads and bring the shoulder or flange squarely down upon the bush.

Having described my invention, what I claim, and desire to secure by Letters Patent, is—

The bush-inserting implement A, provided with the flange or shoulder B, and having the short screw-threaded portion e near its lower end, arranged to operate substantially as and for the purpose described.

In witness whereof I have hereunto set my hand and seal.

GEORGE H. MIXER. [L. S.]

Witnesses:
 J. V. DE VRY,
 WILL B. SCHWARTZ.